United States Patent
Belsom et al.

(12)

(10) Patent No.: US 6,216,442 B1
(45) Date of Patent: Apr. 17, 2001

(54) SUPPORTS FOR CONNECTING A FLOW SLEEVE AND A LINER IN A GAS TURBINE COMBUSTOR

(75) Inventors: Keith C. Belsom, Stuart, SC (US); Abdul-Azeez Mohammed-Fakir, Schenectady, NY (US); Calvin L. Sims, Mauldin, SC (US); Charles E. Steber, Simpsonville, SC (US); Daniel R. Tegel, Simpsonville, SC (US); Henry J. Wiersma, Simpsonville, SC (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/412,965

(22) Filed: Oct. 5, 1999

(51) Int. Cl.[7] .................................. F02C 7/20; F23R 3/60
(52) U.S. Cl. ............................................. 60/39.32; 60/752
(58) Field of Search ................................ 60/39.31, 39.32, 60/752; 431/202, 343

(56) References Cited

U.S. PATENT DOCUMENTS

| 2,748,567 | 6/1956 | Dougherty | 60/39.32 |
|---|---|---|---|
| 2,858,673 | 11/1958 | Wirt | 60/39.32 |
| 5,323,600 | 6/1994 | Munshi | 60/39.32 |

FOREIGN PATENT DOCUMENTS

| 656012 | 8/1951 | (GB) | 60/39.32 |
|---|---|---|---|

*Primary Examiner*—Louis J. Casaregola
(74) *Attorney, Agent, or Firm*—Nixon & Vanderhye

(57) ABSTRACT

In a combustor having an axis, a flow sleeve and a liner, a plurality of circumferentially spaced supports interconnect the upstream ends of the liner and flow sleeve to limit wear on the supports and accommodate relative thermal expansion of the liner and flow sleeve. Each support includes a flow sleeve stop having an angled surface, a groove and a female threaded aperture and a liner stop having a complementary angled surface, a rib and an enlarged opening. By inserting the liner axially through the open upstream end of the flow sleeve, the rib of the liner stop engages the slot of the flow sleeve stop. By passing a bolt having a spring through the enlarged opening of the liner stop and threading the bolt to the flow sleeve stop, the liner is biased for axial downstream movement to maintain the complementary inclined surfaces of the stops in contact with one another, thereby limiting wear and accommodating relative thermal expansion of the flow sleeve and liner.

13 Claims, 3 Drawing Sheets

SUPPORTS FOR CONNECTING A FLOW SLEEVE AND A LINER IN A GAS TURBINE COMBUSTOR

BACKGROUND OF THE INVENTION

The present invention relates to a support system for combustion liners in a gas turbine combustion system and particularly relates to supports interconnecting the upstream ends of a combustion liner to the surrounding flow sleeve or other surrounding structure for reducing wear between the contact surfaces of the parts while maintaining axial, circumferential and radial position of the liner.

In an existing system for supporting a liner within a flow sleeve, three equally spaced tab and slot arrangements are disposed about the upstream end of the combustor between the flow sleeve and liner. A tab and slot arrangement is used to ensure proper positioning of the components and to facilitate assembly. However, combustion pressure oscillations and buffeting due to external and internal air flow can result in relative motion between the tab and slot contact surfaces. This relative motion produces wear on the parts. Currently, combustion inspection intervals are determined in part by the amount of wear that can be permitted before repair is required. Extension of the inspection interval is desirable to reduce operation and maintenance costs and to increase machine availability.

Prior attempts at reducing wear focused on using wear-resistant materials and closely controlled clearances and tolerances between contacting surfaces. That design philosophy, however, has not proven completely successful in reducing wear on the combustor supports. It will be appreciated that various design constraints are imposed on the support system between the liner and the surrounding structural components For example, both relative thermal expansion and manufacturing tolerances of the flow sleeve and liner must be accommodated.

BRIEF SUMMARY OF THE INVENTION

In accordance with a preferred embodiment of the present invention, a combustion liner support system for a gas turbine combustor is provided which is highly resistant to relative motion and wear and which accommodates thermal growth and tolerance stack up between the components of the support system. In a preferred embodiment, the support system includes three equally spaced supports circumferentially spaced around the liner. Each support includes a flow sleeve stop secured to the inner surface of the flow sleeve and a liner stop secured to the outer surface of the liner. The flow sleeve stop includes an angled surface, a slot or groove and a female threaded aperture. The liner stop includes an angled surface complementary in shape to the angled surface of the flow sleeve stop and carries a tab for reception in the groove or slot of the flow sleeve stop. The liner stop includes an enlarged opening for receiving the bolt. Upon installation, the liner is received through the open upstream end of the flow sleeve such that the respective inclined surfaces of the flow sleeve stops and liner stops engage one another and the tabs engage in the slots. A pin or bolt receives a coil spring and the bolt is inserted through the liner stop opening for threaded securement in the flow sleeve threaded aperture. The spring cooperates between the bolt head and the liner stop to load the liner stop against the flow sleeve stop angled surface and hence position the liner in an axial downstream direction, maintaining contact between the inclined surfaces of the liner stops and the flow sleeve stops.

By the foregoing described arrangement, a mechanically rigid and zero clearance support system is provided for the forward end of the combustor liner that is resistant to wear and which accommodates thermal growth between the flow sleeve and liner. The angled surfaces and spring combination, in concert with the steady-state aerodynamic loading, provide sufficient downstream force on the liner to prevent separation of the angled surfaces during operation of the turbine. That is, a combination of the spring load and steady-state aerodynamic load exceed all other mechanical and dynamic loads acting on the liner during operation and ensures that the liner and flow sleeve stops remain in contact with one another. Moreover, the installation of the liners within the flow sleeve is accommodated by simple axial mating of the liner stops and the flow sleeve stops.

In a preferred embodiment according to the present invention, there is provided a gas turbine combustor comprising a liner in the combustor defining a combustor axis, a support structure carried by the combustor, a plurality of supports between the support structure and the liner at circumferentially spaced positions about the combustor, each support including a support structure stop having a first surface and a liner stop having a second surface, the support structure stop and the liner stop being secured to the support structure and the liner, respectively, and being oriented such that the first and second surfaces contact one another for supporting axial and radial loads, the support structure stop and the liner stop having respective cooperable guide surfaces for precluding circumferential movement of the support structure stop and the liner stop relative to one another and a spring engaging between the support structure stop and the liner stop for maintaining axial directed loadings on the first and second surfaces.

In a further preferred embodiment according to the present invention, there is provided for use in a combustor having an axis, liner support structure and a liner about the axis, apparatus for connecting the support structure and liner to one another adjacent an upstream end of the combustor, comprising a liner support structure stop, a liner stop for securement to the liner, the support structure stop including a first surface and a threaded aperture, the liner stop having a second surface generally complementary to the first surface of the support structure stop and an opening, the support structure stop and the liner stop being oriented such that the first and second surfaces of the support structure stop and the liner stop contact one another, with the threaded aperture and the opening generally in registration with one another, a bolt extending through the opening and threaded into the aperture, the bolt having a bolt head and a spring about the bolt between the bolt head and the liner stop for biasing the liner stop for movement in a downstream direction to maintain the liner stop second surface in substantial contact with the support structure first surface.

DETAILED DESCRIPTION OF THE INVENTION

Figure 1:
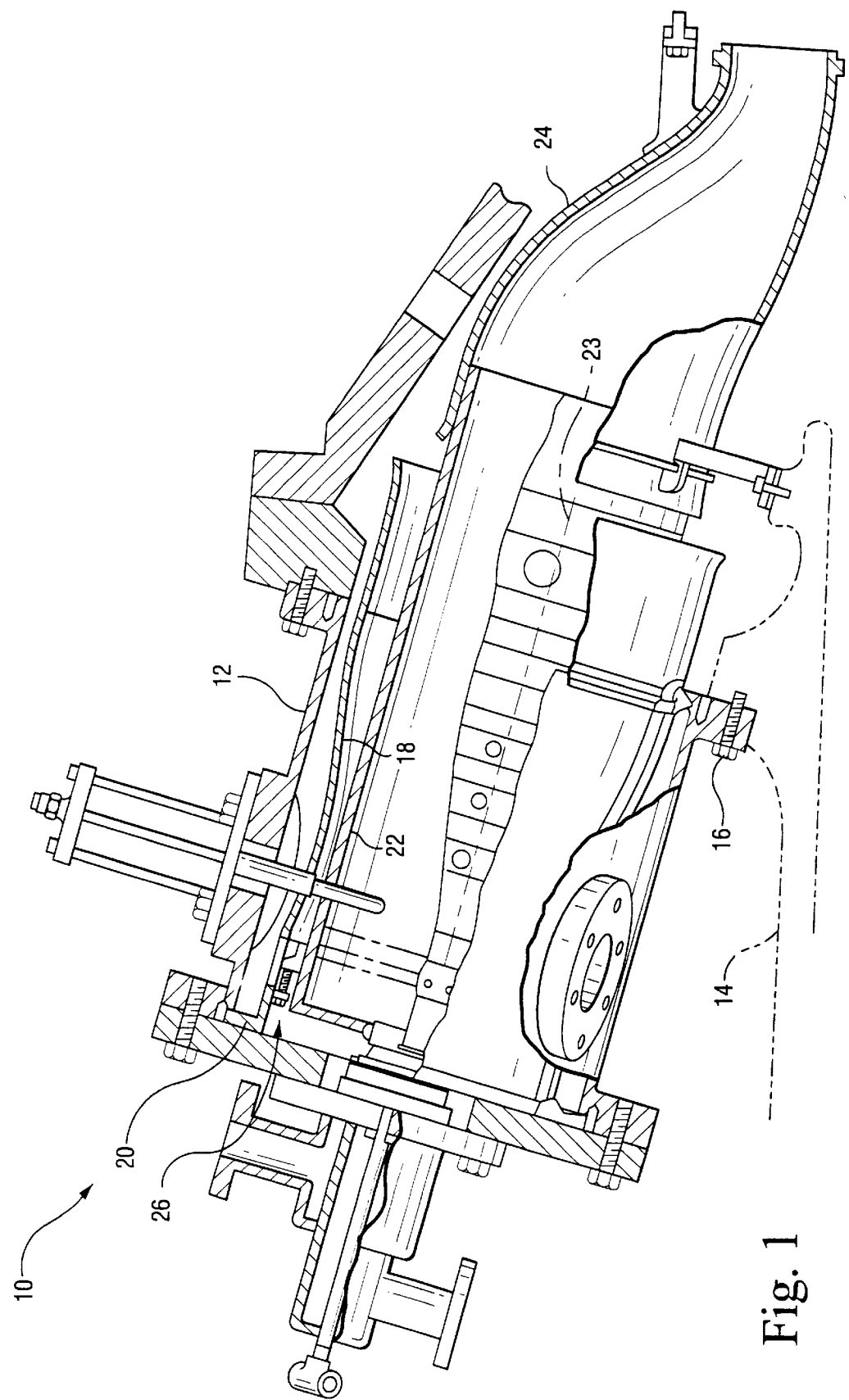
FIG. 1 is a side elevational view with parts broken out and in cross-sectionof a combustor employing a support system according to a preferred embodiment of the present invention.

Referring now to the drawings, particularly to FIG. 1, there is illustrated a combustor, generally designated 10, forming part of a gas turbine. It will be appreciated that a plurality of combustors are arranged in an annular manner about the axis of the gas turbine for supplying hot gases of combustion for driving the turbine. The combustor includes a substantially cylindrical combustor casing 12 secured to a turbine casing 14 by bolts 16. Within the combustion casing 12, there is mounted a support structure for the liner. In the illustrated preferred embodiment, the support structure includes a cylindrical flow sleeve 18 in substantially concentric relation within combustor casing 12. Flow sleeve 18 has a flange 20 at its forward end coupled to the combustor casing 12. Within the flow sleeve 18, there is provided a liner 22 connected at its rearward end with a transition duct 24. The flow sleeve 18 and liner 22 lie generally about a combustor axis 23. The liner 22 is connected at its forward end to the flow sleeve 18 by a support system 26 constructed in accordance with the present invention.

Figure 3:
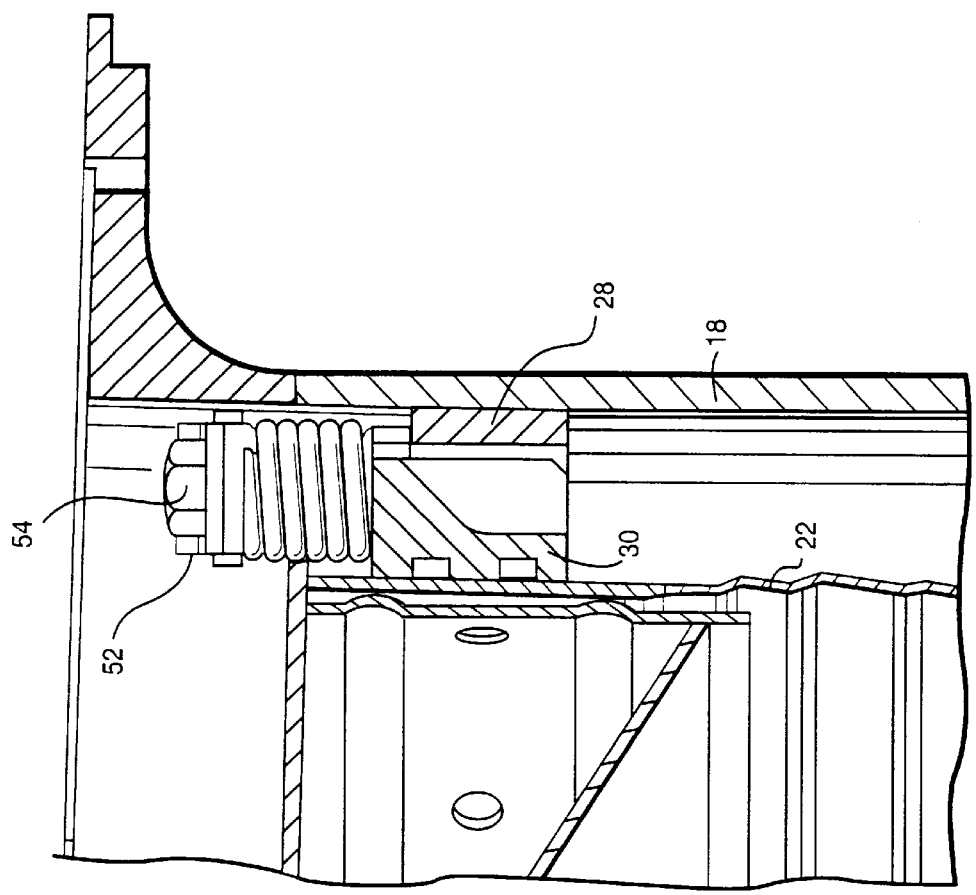
FIG. 3 is an enlarged fragmentary cross-sectional view illustrating the support between the flow sleeve and liner.
Figure 2:
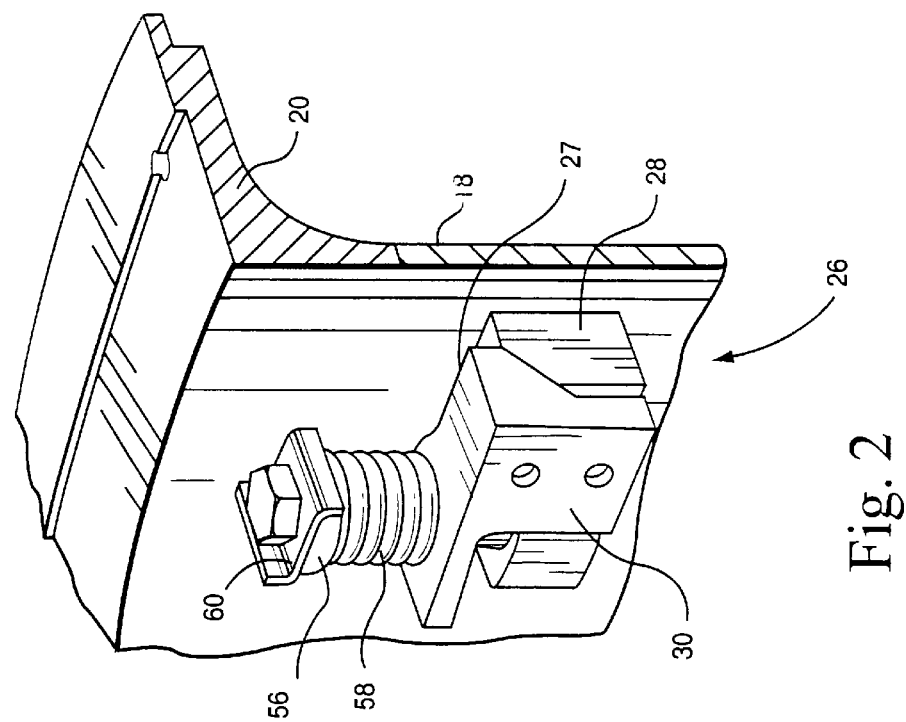
FIG. 2 is a fragmentary perspective view with parts in cross-section of the flow sleeve illustrating the liner stop and flow sleeve stop attached to one another as viewed from the inside of the flow sleeve.
Figure 4:
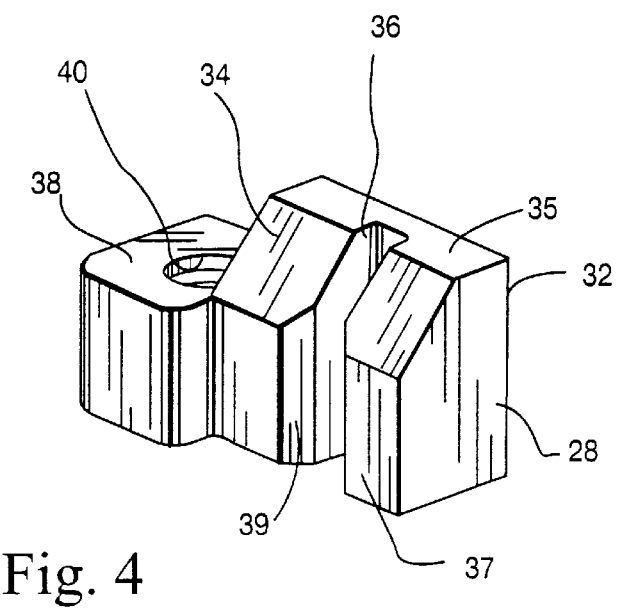
FIG. 4 is a perspective view of the flow sleeve stop.

Referring now to FIGS. 2 and 3, the support system 26 includes a plurality of supports 27 (usually three but not limited to that number) at circumferentially spaced positions between the flow sleeve 18 and the liner 22 adjacent the upstream end of the combustor. Each support 27 includes a flow sleeve stop 28 and a liner stop 30, respectively secured to the flow sleeve 18 and liner 22. Referring to FIG. 4, the flow sleeve stop 28 includes a generally rectilinear stop body 32 having a first angled surface 34, a slot or groove 36 extending in an axial direction through the body 32 and intersecting the angled surface 34, and a flange 38 projecting to one side of the body 32. The flow sleeve stop may be secured to the flow sleeve along its interior surface by suitable means. As can be seen upon a review of FIGS. 3 and 4, the angled surface 34 angles radially inwardly from an upstream end face 35 of the flow sleeve stop 28 toward a downstream interior face 37. The groove 36 extends between the upstream and downstream end faces of the stop 28 and has a flared opening 39 along its interior face. The groove also intersects the angled surface such that surface portions thereof straddle the groove. A female threaded aperture or opening 40 is also provided in the flange 38 facing in an upstream direction, for reasons which will become clear.

Figure 5:
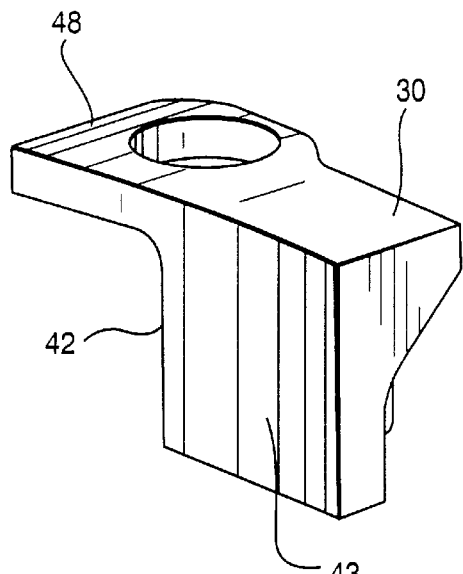
FIG. 5 is a perspective view of the liner stop as viewed from the outside of the liner looking radially outwardly.
Figure 6:
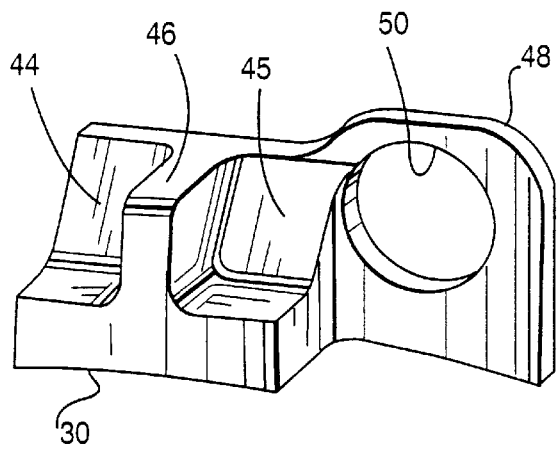
FIG. 6 is a perspective view of the liner stop as viewed from an axial downstream location.

Referring to FIGS. 5 and 6, the liner stop 30 comprises a liner stop body 42 suitably secured along a radially inner face 42 thereof to the outer face of the liner 22. The radially outer surface of the liner stop body 42 has a pair of recesses 44 straddling a rib or tab 46 which projects radially outwardly and in a downstream direction. The recesses 44 are defined in part by angled second surfaces 45 complementary in shape and orientation to angled surfaces 34. The liner stop body 42 also includes a circumferentially projecting flange 48 having an enlarged opening 50. It will be appreciated that the flow sleeve stop 28 and liner stop 30 are dimensioned and configured such that the rib 46 is receivable within the slot 36 and the female threaded aperture 40 is located in axial alignment with the opening 50 of the liner stop when the stops are employed to interconnect the flow sleeve and liner, respectively.

In applying the support system hereof, a plurality of the supports 27, e.g., three such supports, each including a flow sleeve stop 28 and a liner stop 30 are arranged at circumferentially spaced positions between the upstream end of the flow sleeve 18 and liner 22. The flow sleeve stop 32 is secured to the inside surface of the upstream end of the flow sleeve 18, while the liner stop 30 is secured to the outside surface of the liner at its upstream end. With this arrangement, it will be appreciated that the liner 22 can be inserted axially through the open upstream end of the flow sleeve 18. Upon axial insertion, the rib 46 of each liner stop engages in the slot 36 of the flow sleeve stop 28, the rib and slot serving as guide surfaces. Also, it will be appreciated that the threaded aperture 40 and opening 50 are axially aligned relative to one another. Upon further insertion of the liner 22 into the flow sleeve 18, the complementary inclined surfaces 45 of the liner stop 30 and the flow sleeve stop 28 engage one another. With the rib 46 engaged in the slot 36, it will be appreciated that circumferential movement of the liner relative to the flow sleeve is prevented.

To secure the liner and the flow sleeve to one another in a manner to accommodate relative thermal expansion and minimize wear on the contacting parts, e.g., the angled surfaces in the preferred embodiment hereof, a pin or bolt 52 having a flange or a bushing 56, a spring 58 and a lock plate 60 are employed. Particularly, the lock plate 60, bushing 56 and spring 58 are received about the shank of the bolt, the lock plate 60 being disposed between the bolt head 54 and bushing 56. The shank of the bolt is then passed through the opening 50 and threaded into the female aperture 40. By torquing the bolt to compress the spring between the bolt head 54 and the flange 48 about opening 50, a force is produced which biases the liner stop 28 for movement in a downstream direction relative to the flow stop to maintain the complementary inclined surfaces 34 and 45 of the flow stop and liner stop, respectively, in contact with one another. Thermal expansion of the liner relative to the flow sleeve is also accommodated by sliding action between surfaces 34 and 45 and by compression or extension of the spring 58 according to the relative growths of the flow sleeve and liner. The combination of the spring load and the steady-state aerodynamic load on the liner exceeds all other mechanical and dynamic loads acting on the liner during operation and ensures the liner and flow sleeve stops remain in contact, limiting wear on the surfaces (34 and 45) thereof in contact with one another.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas turbine combustor comprising:

a liner in the combustor defining a combustor axis;

a support structure carried by said combustor;

a plurality of supports between said support structure and said liner at circumferentially spaced positions about the combustor;

each said support including a support structure stop having a first surface and a liner stop having a second surface, said support structure stop and said liner stop being secured to said support structure and said liner, respectively, and being oriented such that said first and second surfaces contact one another for supporting axial and radial loads;

said support structure stop and said liner stop having respective cooperable guide surfaces for precluding circumferential movement of said support structure stop and said liner stop relative to one another; and a spring engaging between said support structure stop and said liner stop for maintaining axial directed loadings on said first and second surfaces.

2. A combustor according to claim 1 wherein said first and second surfaces are inclined relative to said axis and complementary to one another.

3. A combustor according to claim 1 wherein each said support includes a helical coil spring between said support structure stop and said liner stop to maintain contact at said first and second surfaces.

4. A combustor according to claim 1 wherein each said support includes a slot in said support structure stop and a tab in said liner stop received in said slot to control or limit angular orientation of said liner with respect to said support structure.

5. A combustor according to claim 1 wherein said support structure comprises a flow sleeve surrounding said liner, said supports being located adjacent an axially upstream end of the combustor, said first and second surfaces being inclined relative to one another and in a radial inward downstream direction enabling insertion of said liner generally axially into said flow sleeve through an upstream open end of said flow sleeve and engagement of said first and second surfaces in response to axial insertion of the liner into the flow sleeve.

6. A combustor according to claim 4 wherein said cooperable guide surfaces include a slot in said support structure stop and a tab on said liner stop, said slot opening in an axial upstream direction to receive said tab upon insertion of said liner into said flow sleeve in an axial downstream direction.

7. A combustor according to claim 1 including a pin secured to said support structure stop and extending through an opening in said liner stop, said pin having a flange, and said spring cooperating between said liner stop and said flange to bias said liner stop for movement in a downstream direction relative to said support structure stop.

8. A combustor according to claim 1 wherein said first and second surfaces are inclined relative to said axis and complementary to one another, said spring including a helical coil spring between said support structure stop and said liner stop, said guide surfaces including a slot in one of said support structure stop and said liner stop and a tab on another of said support structure stop and said liner stop received in said slot.

9. A combustor according to claim 1 wherein said support structure comprises a flow sleeve surrounding said liner, said supports being located adjacent an axially upstream end of the combustor, said first and second surfaces being inclined relative to one another and in a radial inward downstream direction enabling insertion of said liner generally axially into said flow sleeve through an upstream open end of said flow sleeve and engagement of said first and second surfaces in response to axial insertion of the liner into the flow sleeve, said cooperable guide surfaces including a slot on said sleeve stop and a tab on said liner stop, said slot opening in an axial upstream direction to receive said tab upon insertion of said liner into said flow sleeve in an axial downstream direction.

10. For use in a combustor having an axis, liner support structure and a liner about said axis, apparatus for connecting the support structure and liner to one another adjacent an upstream end of said combustor, comprising:

a liner support structure stop;

a liner stop for securement to the liner;

said support structure stop including a first surface and a threaded aperture;

said liner stop having a second surface generally complementary to the first surface of said support structure stop and an opening, said support structure stop and said liner stop being oriented such that the first and second surfaces of said support structure stop and said liner stop contact one another, with said threaded aperture and said opening generally in registration with one another;

a bolt extending through said opening and threaded into said aperture, said bolt having a bolt head; and a spring about said bolt between said bolt head and said liner stop for biasing the liner stop for movement in a downstream direction to maintain said liner stop second surface in substantial contact with said support structure first surface.

11. Apparatus according to claim 9 wherein said first and second surfaces are inclined relative to the axis of the combustor.

12. Apparatus according to claim 9 wherein said support structure comprises a flow sleeve, said support structure stop and said liner stop having guide surfaces generally complementary to one another enabling the liner for guided movement in a generally axial direction relative to the flow sleeve.

13. Apparatus according to claim 11 wherein said guide surfaces comprise a groove in one of said support structure stop and said liner stop and a rib for engaging within said groove on another of said support structure stop and said liner stop.

* * * * *